United States Patent [19]

Camier et al.

[11] 4,218,031
[45] Aug. 19, 1980

[54] CHART BOX FOR THE STRIP CHART OF GRAPHICAL RECORDERS

[75] Inventors: Christian Camier, Amiens; Francis Manier, Sains en Amienois, both of France

[73] Assignee: Honeywell Inc., Minneapolis, Minn.

[21] Appl. No.: 947,875

[22] Filed: Oct. 2, 1978

[51] Int. Cl.² .................... B65H 17/02; B65H 17/38
[52] U.S. Cl. ................................. 242/67.3 R; 346/136
[58] Field of Search ................. 242/67.3, 67.2, 67.1, 242/67.4, 67.5, 55; 346/134, 136

[56] References Cited

U.S. PATENT DOCUMENTS

| | | | |
|---|---|---|---|
| 1,815,681 | 7/1931 | Schellentrager | 242/67.2 |
| 2,690,883 | 10/1954 | Barker et al. | 242/67.3 R X |
| 2,924,499 | 2/1960 | Young et al. | 346/136 X |
| 3,009,665 | 11/1961 | Umrath | 242/67.3 R X |
| 3,216,021 | 11/1965 | Stefansson | 242/67.3 R X |
| 3,281,090 | 10/1966 | Baranowski, Jr. | 242/67.3 R |
| 3,743,201 | 7/1973 | Tarantino et al. | 242/67.3 R |
| 3,798,659 | 3/1974 | Hasebe et al. | 346/136 |
| 3,854,145 | 12/1974 | Carroll, Jr. et al. | 346/136 X |
| 3,864,694 | 2/1975 | Tamura | 346/136 |
| 3,934,835 | 1/1976 | Maxwell | 242/67.3 R X |

*Primary Examiner*—Stanley N. Gilreath
*Attorney, Agent, or Firm*—Laurence J. Marhoefer; Lockwood D. Burton; Mitchell J. Halista

[57] ABSTRACT

A chart box for accommodating a recording strip chart either in a roll or a folded zig-zag form. The chart box includes two compartments for holding either type of recording chart with a chart driving roller arranged between. A first compartment includes a flap for closing an access to the compartment while guiding the strip chart. The first compartment includes recesses for restraining an axle of a rolled strip chart. The second compartment stores the strip chart by gravity and includes a resiliently mounted pressure roller for guiding the strip chart to the drive roller.

10 Claims, 4 Drawing Figures

CHART BOX FOR THE STRIP CHART OF GRAPHICAL RECORDERS

BACKGROUND OF THE INVENTION

1. Field of the Invention

The present invention relates to graphical recorders. More specifically, the present invention relates to recorders for recording on a paper strip chart by continuous or non-continuous feeding of the strip chart. The strip chart is presented in form of a paper roll or zig-zap folded paper.

2. Description of the Prior Art

The prior art recorders of this type have included a magazine used for supporting and receiving the paper strip chart while allowing its unrolling, its passage under the recording stylus, and then its storage after recording. Thus, there are already known strip chart magazines for assuring these functions but they are designed to receive the strip chart either as paper rolls or as zig-zag folded paper, and they are not able to receive in the same manner both kinds of paper so that two types of magazines are needed.

SUMMARY OF THE INVENTION

It is the object of the invention to provide a chart box for the strip chart of graphical recorders able to receive independently both types of strip chart and allowing the charging therewith in a simple and quick manner.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Detailed Description

Figure 1:
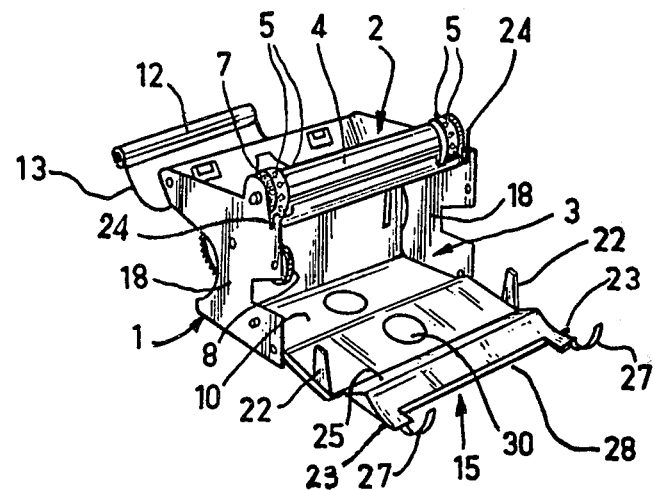
FIG. 1 is a perspective view of an empty and opened chart box according to an example of the invention.

The example of a chart box shown in the drawings and embodying the present invention includes a support chassis 1 defining a first compartment 2 at the upper portion of the chassis 1 for receiving the blank strip chart and a second compartment 3 at the lower portion of the chassis 1 for receiving the recorded strip chart.

Between these two compartments the strip chart is arranged to pass over a cylinder 4 supported by the chassis 1 and provided at its ends with radially projecting pins 5 for driving the strip chart through perforations along the edge of the strip chart. Cylinder 4 is rotatably driven by a gear wheel 6 supported by the chassis 1 and meshing on the one side with gear wheel 7 at one end of the cylinder 4 and on the other side with the gear 8 of a motor driving system (not shown) for the strip chart of the recorder.

Figure 3:
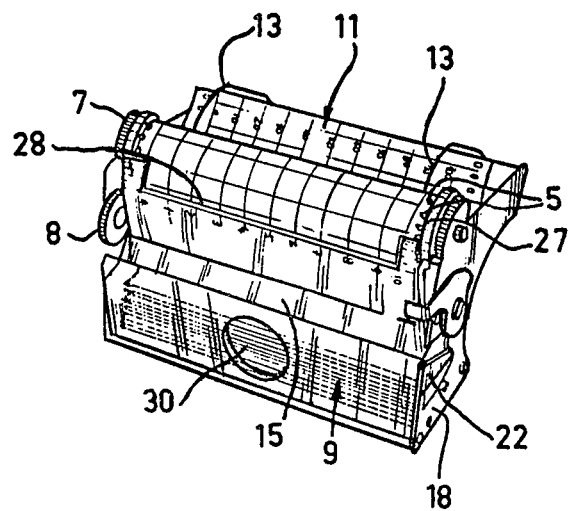
FIG. 3 is a perspective view of the device of FIG. 1 using a zig-zag strip chart.

Two strip chart receiving compartments 2 and 3 are V-shaped in order to allow receipt of the zig-zag strip charts which are simply placed therein. The compartments are located on opposite sides of the cylinder 4 and are parallel thereto. Stack 9 (FIG. 3) of the recorded strip chart in form of a rectangular block is shown resting on a bottom 10 of compartment 3 while stack 11 of the blank strip chart is shown resting by gravity in the V-shaped trough (FIG. 2) formed by the rectangular walls of the compartment 2. The compartment 2 is further inclined from the vertical to allow a better unfolding of the zig-zag strip chart.

The strip chart is held against the cylinder 4 by a press roll 12 mounted on two flexible bars 13 fixed at the chassis 1 for constantly and resiliently applying the paper strip chart against one of the walls 14 of the compartment 2. The press roll 12 may be selectively tilted (FIG. 1) to give free access to the compartment 2.

The front face of compartment 3 is closed by a flap 15 made from a transparent plastic material and pivotally mounted at its lower end in the plane of the lower rim in front of the chassis 1. For this purpose flap 15 includes two lateral pins 16 movable in two elongated slots 17 in the side walls 18 of the chassis while the flap 15 is able to oscillate free around the axle of pins 16. While the flap 15 does not specifically have the function of holding the stack 9 of the recorded strip chart (zig-zag folded paper) because the stock is resting simply on the bottom 10, the flap 15 by its shape contributes to good stacking of the strip chart.

Figure 4:
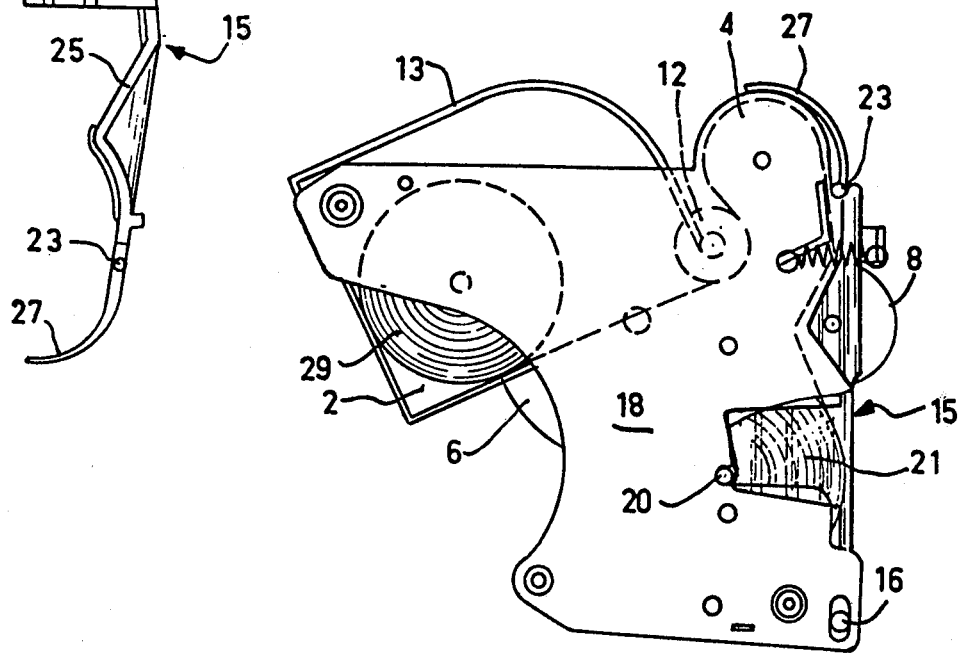
FIG. 4 is a side view of the device of FIG. 1 using a paper roll strip chart.

On the other hand in the use of a strip chart on a roll, the take-up roll has to be supported and fixed in the compartment 3. For this purpose a recess 19 in the walls 18 is provided to receive the axle 20 of the take-up roll 21 (FIG. 4). The attachment of the axle 20 is assured by two lateral clips 22 attached to flap 15 and shaped to catch the ends of the axle 20 in the recesses 19 when flap 15 is lifted and put into place on the chassis 1. One end of the axle 20 is provided with a conventional friction clutch and gear wheel (not shown) arranged to be driven by the gear train driving gear wheel 7 attached to the cylinder 4. The friction clutch is provided to accommodate a varying diameter of the strip chart on the roll which changes with time for a constant strip chart feed. In the closed position of flap 15 (FIG. 3) the locking of flap 15 is assured by two lateral pins 23 molded together with flap 15 and engaging into two recesses 24 located in the upper front portion of the chassis whereby in the closed position the flap 15 is suspended by pins 23.

Flap 15 includes in its middle inner portion an inclined face 25 designated to constrain the strip chart against cylinder 4 and against a resilient guidance strip 26 formed by an extension of wall 14 of the compartment 2. For facilitating likewise a proper application of the strip chart to cylinder 4 in the area of pins 5, flap 15 is provided with two curved end extensions 27. Between the extensions 27 the flap 15 has a cut-out 28 for facilitating the reading of the strip chart and for the passage of the recording stylii. Flap 15 also includes an opening 30 to aid the manual tilting of flap 15.

In the event of a strip chart on a paper roll (FIG. 4) the feed roll 29 is inserted in the compartment 2 and is simply resting therein by gravity. Finally, in the use of a zig-zag folded strip chart, to provide for better separation of the single sheets of the stack of blank strip chart 11 a resilient extension or finger 31 is provided (FIG. 2) for pressing in the stack 11 slightly against back wall 32 of compartment 2. The finger 31 is removed when the chart box chassis 1 is used for a strip chart on a paper roll.

MODE OF OPERATION

Figure 2:
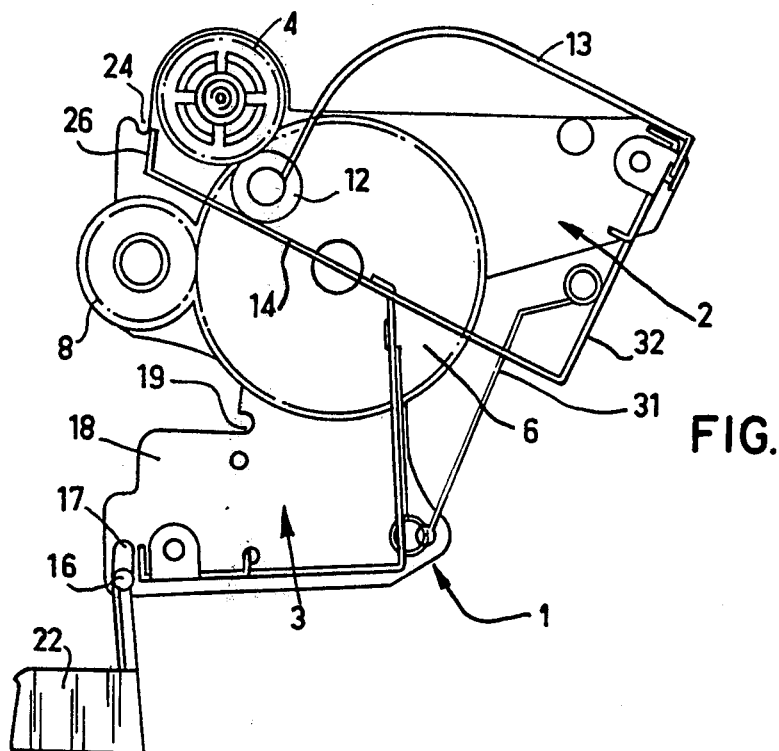
FIG. 2 is a side view of the device shown in FIG. 1.

Setting in place or removal of zig-zag strip charts (FIG. 3) is very simple. After removing the chart box chassis 1 from the housing of the strip chart recorder bars 13 are lifted and roll 12 is brought into the position according to FIG. 1, then flap 15 is lowered as shown in FIG. 2. There is now a free access to the compartments 2 and 3 in which the stack of the blank or written zig-zag folded strip chart is simply inserted. Th correct positioning of the lateral perforations of the strip chart with regard to pins 5 is made by means of sprocket 8.

After setting in place the resilient finger 31 and press roll 12, the flap 15 is lifted (FIG. 3) and the chart box may be reintroduced in to the recorder. In the use of a strip chart on a paper roll, the take-up roll 21 (FIG. 4) is supported by its axle 20 engaging recesses 19 in the lateral walls 18 and kept in place by clips 22. The feed roll 29 is resting by gravity in the compartment 2. The unrolling of the strip chart independently of its type is assured in the usual manner by the gear train of gear wheels 7 and 8 meshing with the gear wheel 7 driving the cylinder 4.

Accordingly, it may be seen that there has been provided, in accordance with the present invention, an improved chart box for accommodating either a zig-zag or rolled recording strip chart.

The embodiments of the invention in which an exclusive property or privilege is claimed are defined as follows:

1. A chart box for the strip chart of graphical recorders adapted to receive strip charts in form of folded paper or paper rolls, comprising
   a support chassis,
   a driving cylinder for the strip chart rotatably supported by said chassis,
   a first compartment defined by said chassis for receiving a blank strip chart, and including a pair of mutually perpendicular walls parallel to an axis of said cylinder,
   a second compartment defined by said chassis for receiving a recorded strip chart and having a flat bottom for supporting a strip chart stack and means for supporting the axle of a paper take-up roll,
   means arranged between the first compartment and said driving cylinder for applying the strip chart against said driving cylinder, said means between the first compartment and the driving cylinder being supported by said chassis and
   a flap hinged in front of said chassis and being arranged to close said second compartment, whereby said flap in its closed position cooperates with said means of said second compartment for fixing the axle of said paper take-up roll.

2. A chart box according to claim 1, characterized in that said means for supporting the axle of the take-up roll are formed by recesses in side walls of the second compartment and that said flap comprises two lateral clips for keeping in place said roll axle in the recesses at a closed position of said flap.

3. A chart box according to claim 1, characterized in that said flap includes an inclined portion designed to urge the strip chart against said driving cylinder and against a resilient means fixed to said chassis.

4. A chart box according to claim 1, characterized in that said flap is pivotable around the lower portion of said chassis and includes means for allowing the locking of said flap with the chassis in its vertical closing position.

5. A chart box according to claim 1, characterized in that said flap includes at its lateral ends two resilient curved fingers for guidance of the strip chart around said driving cylinder when said flap takes the closing position.

6. A chart box according to claim 1, characterized in that said means arranged between the first compartment and the driving cylinder to apply the strip chart against the cylinder includes a press roll mounted at the ends of resilient retractable bars which roll presses the strip chart against one of the walls of said first compartment.

7. A chart box according to claim 1, characterized in that said first compartment includes a resilient finger which in the use of a zig-zag folded strip chart presses the stack of the blank strip chart against one of said walls of said first compartment to allow the correct feeding of each sheet of the stack independently of its thickness.

8. A chart box according to claim 2 characterized in that said flap includes an incline portion designed to urge the strip chart against said driving cylinder and against a resilient means fixed to said chassis.

9. A chart box according to claim 8, characterized in that said flap is pivotable around the lower portion of said chassis and includes means for allowing the locking of said flap with a chassis in its vertical closing position.

10. A chart box according to claim 9 characterized in that said first compartment includes a resilient finger which in the use of a zig-zag folded strip chart presses the stack of the blank strip chart against one of said walls of said first compartment to allow the correct feeding of each sheet of the stack independently of its thickness.

* * * * *